United States Patent [19]
Jenkins

[11] Patent Number: 5,533,480
[45] Date of Patent: Jul. 9, 1996

[54] LOW FORCE ACTUATABLE FUEL INJECTOR

[75] Inventor: Peter E. Jenkins, Highlands Ranch, Colo.

[73] Assignee: MTN International, LLC, Denver, Colo.

[21] Appl. No.: 484,167

[22] Filed: Jun. 7, 1995

[51] Int. Cl.⁶ .................................................. F02M 51/06
[52] U.S. Cl. ........................ 123/294; 123/472; 239/585.4; 251/129.07
[58] Field of Search .................................. 123/294, 305, 123/472; 239/533.2–533.12, 585.1–585.5, 900; 251/30.01, 30.02, 129.07

[56] References Cited

U.S. PATENT DOCUMENTS

| | | | |
|---|---|---|---|
| Re. 32,997 | 7/1989 | Burt et al. | 251/86 |
| 2,114,961 | 4/1938 | Gille | 137/339 |
| 2,121,657 | 6/1938 | Fisher | 335/245 |
| 2,543,010 | 2/1951 | Gardner | 251/129.07 |
| 2,896,599 | 7/1959 | Ensign | 123/527 |
| 2,949,900 | 8/1960 | Bodine | 123/472 |
| 3,464,627 | 9/1969 | Huber | 239/96 |
| 3,516,395 | 6/1970 | Bassot et al. | 123/472 |
| 3,782,639 | 1/1974 | Boltz et al. | 239/405 |
| 3,839,943 | 10/1974 | Ufnalewski | 91/454 |
| 4,179,069 | 12/1979 | Knapp et al. | 239/125 |
| 4,230,273 | 10/1980 | Claxton et al. | 239/125 |
| 4,304,258 | 12/1981 | Mitchell | 137/596.17 |
| 4,342,443 | 8/1982 | Wakeman | 251/137 |
| 4,392,812 | 7/1983 | Yoshii | 431/73 |
| 4,513,728 | 4/1985 | Ullman et al. | 123/527 |
| 4,519,370 | 5/1985 | Iwata | 123/432 |
| 4,524,743 | 6/1985 | McAuliffe, Jr. et al. | 123/438 |
| 4,527,590 | 7/1985 | Kolze | 137/596.17 |
| 4,545,345 | 10/1985 | Pagdin et al. | 123/299 |
| 4,586,656 | 5/1986 | Wich | 123/458 X |
| 4,617,904 | 10/1986 | Pagdin | 123/525 |
| 4,676,478 | 6/1987 | Kiuchi | 251/129.08 |
| 4,702,212 | 10/1987 | Best et al. | 123/472 |
| 4,712,767 | 12/1987 | Losser et al. | 251/129.14 |
| 4,717,079 | 1/1988 | de Concini | 239/585.5 |
| 4,746,094 | 5/1988 | Cummins | 251/129.14 |
| 4,765,587 | 8/1988 | Cummins | 251/129.19 |
| 4,844,339 | 7/1989 | Sayer et al. | 239/5 |
| 4,984,549 | 1/1991 | Mesenich | 123/472 |
| 5,012,781 | 5/1991 | Yokoyama et al. | 123/353 |
| 5,188,017 | 2/1993 | Grant et al. | 91/459 |
| 5,193,743 | 3/1993 | Romann et al. | 239/1 |
| 5,358,215 | 10/1994 | Buth et al. | 251/129.21 |
| 5,394,852 | 3/1995 | McAlister | 123/494 |
| 5,398,657 | 3/1995 | Press et al. | 123/472 |
| 5,421,521 | 6/1995 | Gibson et al. | 239/585.4 |

Primary Examiner—Tony M. Argenbright
Attorney, Agent, or Firm—Sheridan Ross & McIntosh

[57] ABSTRACT

The invention relates to a fuel injector which requires preferably no more than about 10 pounds-force to open the fuel injector, regardless of the pressure downstream of the injector and interfacing with the injector when closed prior to injection. For instance, this low actuation force may be utilized for each and every discharge pressure within the range from a vacuum to about 1,000 psi. Principally, for a given inlet pressure (e.g., the pressure within the fuel injector when closed prior to injection) and a given discharge pressure (e.g., the pressure downstream of the discharge port when closed and interfacing with the fuel injector), at least two surface areas are jointly selected to allow for the use of this reduced actuation force. One of these surface areas is exposed to the inlet pressure and exerts a force which is generally directed to close the discharge port. The other of these surface areas is exposed to the discharge pressure and exerts a force which is generally directed to open the discharge port. Once the inlet pressure and discharge pressure are established for the design of the fuel injector, the noted surface areas may be jointly selected to provide for the use of less than about 10 pounds-force to open the fuel injector, preferably in no more than about 1 millisecond.

43 Claims, 4 Drawing Sheets

LOW FORCE ACTUATABLE FUEL INJECTOR

FIELD OF THE INVENTION

The present invention generally relates to engines and, more particularly, to a fuel injector which requires a low actuation force (e.g., the force which opens the injector's discharge port for injection of the fuel into the intake port or directly into the cylinder), even when the injector is used in a direct injection system and opens as the engine piston approaches its top-dead-center position.

BACKGROUND OF THE INVENTION

Fuel injection has long been used in engine applications. Port injection systems inject the fuel directly into the intake port of the engine (e.g., as the intake valve opens). Direct injection systems, on the other hand, inject the fuel directly into the cylinder. Issues which are often confronted in fuel injector design are the amount of force required to open the fuel injector for the discharging of fuel and the time required to completely open/close the fuel injector.

Port injection systems allow for the use of reduced forces for opening the fuel injector. Specifically, since the injection from the fuel injector is into a relatively low pressure environment (e.g., since the engine piston is on its intake stroke), a return spring of reduced capacity may be used to close the fuel injector (e.g., less spring force is required to close the fuel injector). Direct injection systems which allow for the use of reduced forces for opening the fuel injector do so by opening the fuel injector when the piston is at or near its bottom-dead-center position when the pressure in the cylinder is also relatively low.

The above-described port and direct fuel injection systems which allow for reduced actuation forces for the fuel injector suffer from reduced volumetric efficiencies. One way to enhance the volumetric efficiency is to inject the fuel as the piston approaches its top-dead-center position. However, since the cylinder pressure in this case exceeds both the pressure in a port injection system as well as the pressure in a direct injection system which injects fuel with the piston at the bottom-dead-center position, more force is required to close the fuel injector. In the case where the "closing force" is provided by a return spring, this means that the spring must have an increased capacity (e.g., increased force-generating capabilities). This in turn requires the use of larger actuation forces to open the fuel injector for injection. Consequently, direct injection systems which inject with the piston at or near its top-dead-center piston typically require larger actuation forces (e.g., at least about 50 pounds-force) to open the injector in comparison to direct injection systems which inject with the position at or near its bottom-dead center position.

SUMMARY OF THE INVENTION

The present invention generally relates to fuel injectors which require relatively low actuation forces to open the fuel injector for discharge. These low actuation forces are not dependent upon injecting into a low pressure environment. Instead, the low actuation forces associated with the present invention (e.g., no more than about 40 pounds-force, more preferably no more than about 10 pounds-force, and even more preferably no more than about 5 pounds force) will open the fuel injector even when injecting into relatively high pressure environments (e.g., during the compression stroke of an engine piston as it nears its top-dead-center position).

One aspect of the present invention is a fuel injector which includes a fuel injector body. An inlet port associated with the fuel injector body is fluidly interconnectable with a fuel supply (e.g., a source of pressurized gas). The fuel injector body also includes a reservoir which is fluidly interconnected with the inlet port and a discharge port which is associated with the fuel injector body and which is fluidly interconnectable, directly or indirectly, with a combustion chamber (e.g., an engine cylinder). That is, the fuel injector may be used in a direct injection system (e.g., injecting directly into an engine cylinder) or in a port injection system (e.g., injecting into a intake port which is then fluidly interconnected with an engine cylinder).

The above-noted fuel injector further includes a discharge control member (e.g., a fuel injector "needle") which is movable (e.g., axially) between at least first and second positions. In the first position the discharge control member blocks the discharge port and in the second position the discharge control member is displaced from the discharge port to allow for fuel injection. The discharge control member includes at least two surface areas which are of a magnitude and disposition such that preferably no more than about 10 pounds-force is required to move the discharge control member to its second position for fuel injection. A first of these surface areas includes at least a first surface (e.g., the first surface area may be defined by one or more surfaces) which is exposed to the pressurized fluid in the reservoir of the fuel injector body and is disposed such that this pressurized fluid exerts a force on the discharge control member which biases the discharge control member toward its first position (i.e., to maintain blockage of the discharge port). A second surface area is disposed such that a fluid pressure acting on the second surface area biases the discharge control member toward its second position (i.e., to open the discharge port for fuel injection). This second surface area is defined at least in part by a second surface of the discharge control member which is exposed to the discharge port and thus "sees" the fluid pressure downstream of the fuel injector. By selecting magnitudes for the first and second surface areas based upon a given inlet pressure and a given discharge pressure or that pressure immediately downstream of the fuel injector, the forces required to open the fuel injector can be maintained at preferably no more than about 10 pounds-force.

In order to accommodate for a certain mass flow rate through the discharge port and/or to provide for further regulation of the amount of force required to open the fuel injector for fuel injection, the second surface area may be further defined by an area of a third surface which is exposed to the pressurized fluid in the fuel injector body. This third surface is disposed such that the pressure of the pressurized fluid in the reservoir of the fuel injector body acting on the third surface exerts a force on the discharge control member which is generally in the direction of the second position of the discharge control member. In one embodiment, this is provided by providing a chamfered surface on the end of the discharge control member which interfaces with the discharge port. In this case, part of the chamfered surface will seat on the perimeter of the discharge port (and part may in fact be disposed within the port) to expose at least the end of the discharge control member to the discharge port, and part of the chamfered surface will extend away from the discharge port into the fuel injector body.

In one embodiment of this first aspect of the invention, the discharge control member is an axially extending rod having first and second ends. The first end is disposed within a cavity formed in a plunger which is an axially movable portion of a solenoid. The plunger and discharge control member are interconnected such that the first end is spaced from the plunger and the plunger and discharge control member are sized such that pressurized medium may flow into this space. The second end of the rod interfaces with the discharge control port. Through joint selection of the first surface area (e.g., the area of the first end of the discharge control member) and the second surface area (e.g., the second end of the discharge control member interfacing with the fluid-containing volume of the discharge port), the forces required to be exerted by the solenoid on the discharge control member, via the plunger, to move the discharge control member from its first position to its second position to initiate fuel injection may be limited to preferably no more than about 10 pounds-force.

Another aspect of the present invention is a method for providing fuel to a cylinder of an engine, directly or indirectly, using a fuel injector which includes a discharge port. This method includes the steps of closing the discharge port with a discharge control member and providing a pressurized fluid to the fuel injector. The fuel may be continually or intermittently provided to the fuel injector. As such, the providing step may be characterized as being performed at least after the closing step, but may in fact continue after the closing step.

The method of this aspect of the present invention further includes the step of opening the discharge port by moving the discharge control member after a sufficient supply of fuel is within the fuel injector (e.g., in the case of a continuous supplying of fuel to the fuel injector, this step may be characterized as being performed after at least a portion of the providing step). This opening step includes the substep of exerting a net force of preferably no more than about 10 pounds-force on the discharge control member when the discharge pressure, namely that pressure exerted on the discharge control member through the discharge port when the discharge control member is blocking the discharge port, ranges from a vacuum to 1,000 pounds per square inch. That is, for any pressure within this range from a vacuum to 1,000 pounds per square inch, preferably no more than about 10 pounds-force is required to be exerted on the discharge control member to move it to "unblock" the discharge port. As such, the methodology may be employed in a direct injection system and the injection may occur with the piston near its top-dead-center position (e.g., after having traveled at least about 90% of its stroke from bottom-dead-center toward top-dead-center).

The opening and closing of the fuel injector may be provided by moving the discharge control member from a first position where it is closing the discharge port to a second position where it is displaced from the discharge port such that pressurized fluid may flow out of the fuel injector through the discharge port. The manner in which forces may be exerted on the discharge control member to facilitate its movement between the first and second positions not only provides further inventive aspects of the present invention, but also may be utilized to realize the noted force actuation constraints for opening the fuel injector for injection.

The closing step of this second aspect of the present invention may utilize, singularly or combinatively, the pressure within the fuel injector to exert a force on the discharge control member which is directed generally toward the first position and/or a force exerted on the discharge control member by a biasing member (e.g., a compressed spring or the like) to move the discharge control member from its second position to its first position to close the discharge port. The force exerted on the discharge control member by the pressurized fluid within the fuel injector may also be used to maintain closure of the discharge port until injection is desired.

The opening step of this second aspect of the present invention may utilize the pressure in the fuel injector to actually move the discharge control member from its first position to its second position to initiate fuel injection. For instance, at least one surface of the discharge control member which is exposed to the pressure within the fuel injector may be disposed/oriented such that the pressure acting thereon generates a force having at least one vector which is at least generally directed toward the second position of the fuel injector. The opening steps may also use, singularly or in combination with the above, the discharge pressure which acts on the discharge control member when in its first position (e.g., the pressure within the cylinder in the case of direct injection).

The method of this second aspect of the invention may further include the step of opening the fuel injector in preferably no more than about 1 millisecond. The method may also include the step of closing the fuel injector in preferably no more than about 1 millisecond.

DETAILED DESCRIPTION

Figure 1:
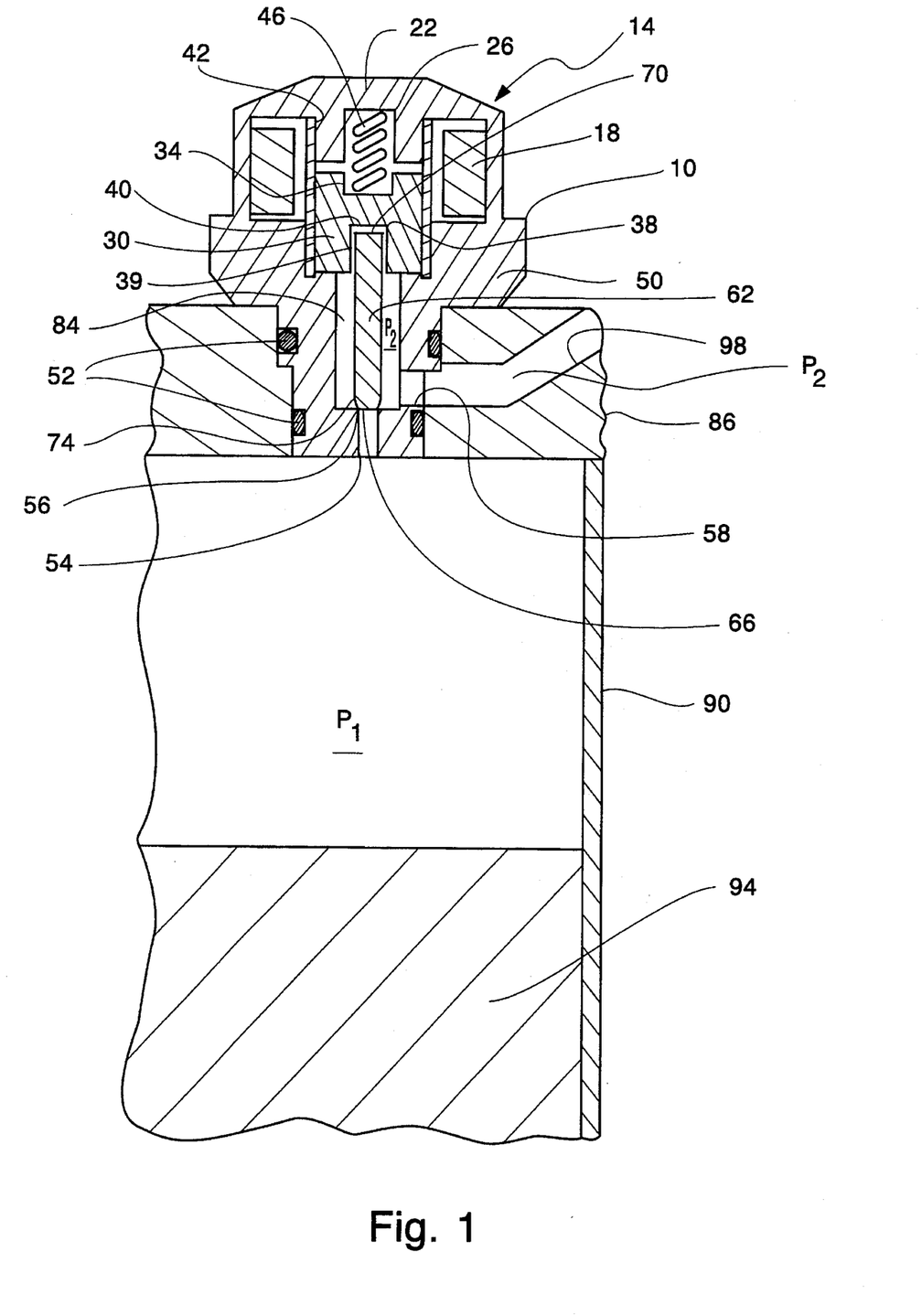
FIG. 1 is a cross-sectional view of one embodiment of a fuel injector in accordance with principles of the present invention.

The present invention will be described in relation to the accompanying drawings which assist in illustrating the various pertinent features thereof. Referring to FIG. 1, a fuel injector 10 is illustrated in a direct injection system, although the fuel injector 10 may be used in port injection systems as well. In the illustrated embodiment the fuel injector 10 is appropriately interconnected (e.g., via threaded engagement) with an engine cylinder head 86 which is disposed on one end of an engine cylinder 90 of an engine (e.g., internal combustion engine, external combustion engine, mixed flow engine). An engine piston 94 is slidably disposed within the cylinder 90 and reciprocates between a bottom-dead-center (BDC) position and a top-dead-center (TDC) position in a manner known in the art. As will be discussed in more detail below, the design of the fuel injector 10 allows the injector 10 to open with reduced actuation forces and also preferably in a reduced time period, even if the injector 10 opens as the piston 94 approaches TDC. The injector 10 may be used with a variety of fuels (e.g., liquid, gaseous), but is believed to be particularly useful with natural gas engine applications.

The fuel injector 10 includes a fuel injector housing or body 50, a portion of which provides for attachment of the fuel injector 10 to the cylinder head 86. One or more O-rings 52 may be utilized to obtain an appropriate seal for this interconnection. The fuel injector body 50 also has an inlet port 58 which fluidly interconnects an inlet passage 98 in the cylinder head 86 to a reservoir 84 in the fuel injector body 50. Fuel from an appropriate supply may thus be provided under pressure through the inlet passage 98, through the inlet port 58, and into the reservoir 84 for injection into the cylinder 90.

A discharge control member 62 interacts with a discharge port 54 on an end of the fuel injector body 50 to control the flow from the fuel injector 10 to the cylinder 90. The discharge control member 62 is movably interconnected with the fuel injector body 50 and is axially movable between at least first and second positions. A bushing (not shown) may be used to at least assist in guiding the discharge control member 62. The discharge control member 62 includes a first end 66 and a second end 70. In the first position (FIG. 1 and FIGS. 2A–B), the first end 66 of the discharge control member 62 seats against a surface 56 which is disposed about the discharge port 54 to substantially block the discharge port 54. In the second position (not shown), the first end 66 of the discharge control member 62 is vertically displaced from the discharge port 54 and thus disengaged from the surface 56 such that fuel from the reservoir 84 may flow into the discharge port 54 and then into the cylinder 90.

An appropriate drive assembly is interconnected with the discharge control member 62 to reciprocate the member 62 between the two noted positions. One such appropriate drive assembly is a solenoid 14 illustrated in FIG. 1 which includes coil windings 18, a stationary core 22, and a movable plunger 30. The plunger 30 is appropriately interconnected with the discharge control member 62. In this regard, the plunger 30 includes a lower plunger cavity 38 having a substantially cylindrical sidewall 39 and an end wall 40. The second end 70 of the discharge control member 62 is disposed within the lower plunger cavity 38 and is displaced from the endwall 40 of the lower plunger cavity 38 to define an upper gap 102. A side gap 106 also exists between the sidewall 39 of the lower plunger cavity 38 and the portion of the discharge control member 62 contained therein.

The only substantial limitation on the actual interconnection between the plunger 30 and the discharge control member 62 is that pressurized fuel must be present in the upper gap 102 during operation of the fuel injector 10 and that the discharge control member 62 must move with the plunger 30 to open the fuel injector 10. Magnetic interconnections as well as at least certain mechanical interconnections may meet this limitation. The mechanical interconnection may include the use of one or more set screws (not shown) to secure the plunger 30 to the discharge control member 62 to maintain a suitable side gap 106. The mechanical interconnection may also include a threaded engagement between the discharge control member 62 and the plunger 30. A threaded engagement allows for adjustment of the size of the upper gap 102 which may be desirable in some instances. However, in this instance there still must be a sufficient side gap 106 between the sidewall 39 of the lower plunger cavity 38 and the discharge control member 62 to allow for pressurized fuel to act on the second end 70 of the discharge control member 62 to allow for reduced actuation forces for operating the fuel injector 10 as discussed below.

When the coil windings 18 are activated by the provision of an appropriate current thereto, the core 22 and plunger 30 are magnetized. Due to the opposite polarities between the adjacent ends of the core 22 and the plunger 30, the plunger 30 is pulled toward the core 22. A plunger bushing (not shown) may be disposed between the plunger core 30 and the part of the fuel injector body 50 disposed radially outwardly therefrom to facilitate this movement. The retraction of the plunger 30 toward the core 22 moves the discharge control member 62 from its first position where the first end 66 thereof is blocking the flow of fuel into the discharge port 54, to its second position where the first end 66 is displaced from the discharge port 54 such that fuel may flow out of the fuel injector 10, through the discharge port 54, and into the cylinder 90.

After the desired amount of fuel has been provided to the cylinder 90, the current to the coil windings 18 is discontinued. The magnetic field collapses such that the degree of magnetic attraction between the core 22 and the plunger 30 is significantly reduced if not completely terminated. In order to return the discharge control member 62 from its second position to its first position, an appropriately sized return spring 46 is disposed between the core 22 and the plunger 30. Specifically, one end of the return spring 46 is disposed in an upper plunger cavity 34, while the opposite end of the return spring 46 is disposed in a core cavity 26. The force exerted by the return spring 46 is due to being compressed during the attraction of the plunger 30 toward the core 22 when current is applied to the coil windings 18.

The fuel injector 10 is specifically designed such that the amount of force required to move the discharge control member 62 from its first position (where the first end 66 is blocking the discharge port 54) to its second position (where the first end 66 is vertically displaced from the seating surface 56) is significantly reduced in comparison with known designs, and importantly the use of these reduced actuation forces is not limited to use with only low discharge pressures. The discharge pressure is that pressure which exists within the discharge port 54 while the first end 66 of the discharge control member 62 is seated on the seating surface 56, and is thus reflective of the pressure in the cylinder 90 at this time.

Basically, the use of reduced actuation forces without dependency upon reduced discharge pressures is realized by disposing/sizing various surfaces of the discharge control member 62 based upon the discharge pressure that will be encountered just prior to fuel injection and based upon the inlet pressure. The inlet pressure is that pressure which exists within the reservoir 84 and thus in the upper gap 102 of the fuel injector body 50. Using the discharge pressure and inlet pressure as design criteria, various surfaces of the discharge control member 62 may be oriented and sized such that the forces exerted on the discharge control member 62 due to the pressures to which these surfaces are exposed will allow low actuation forces to be utilized to open the fuel injector 10, and even to close the injector 10.

Figure 2A:
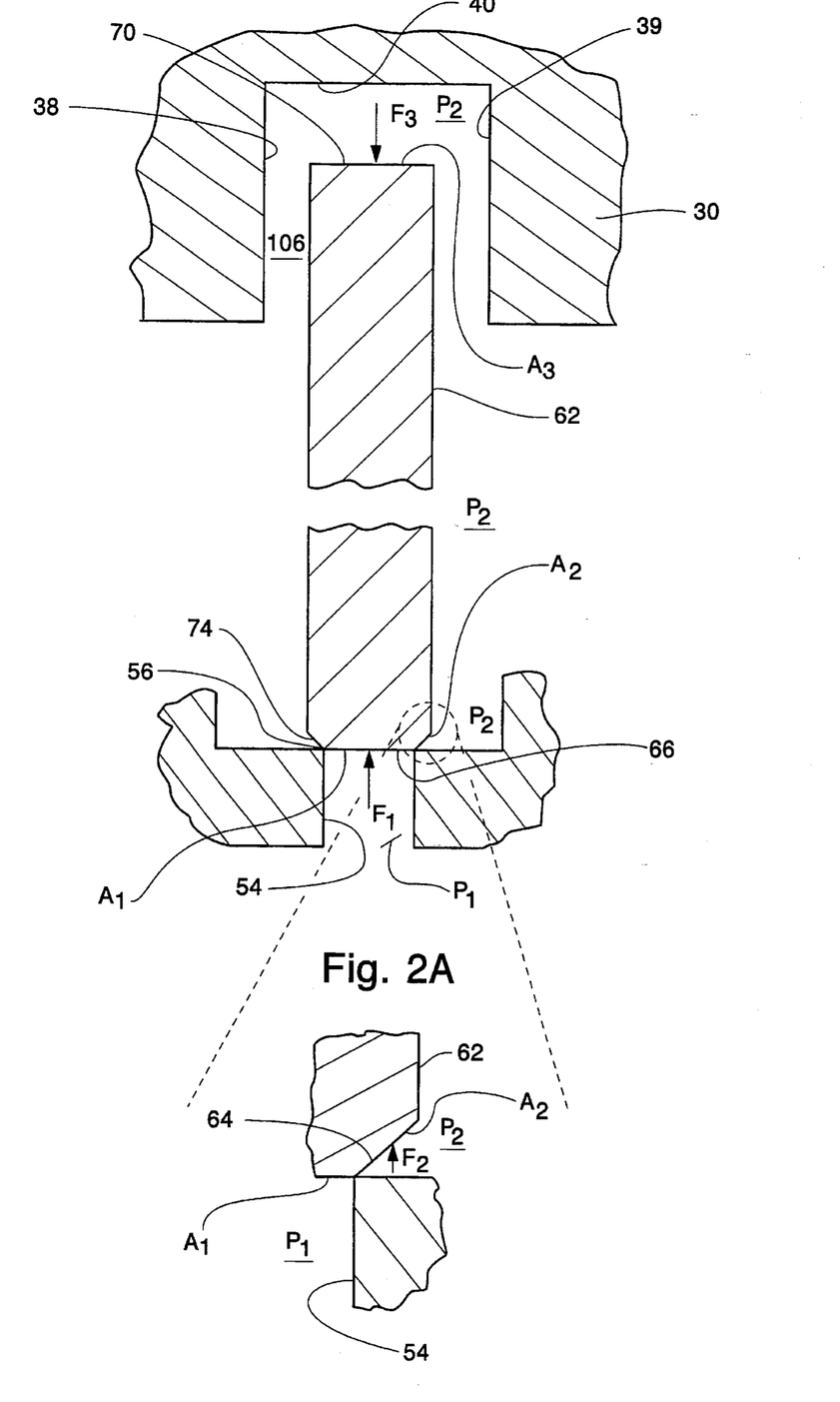
FIG. 2A is an enlarged cross-sectional view of the discharge control member of the fuel injector of FIG. 1.

In the illustrated embodiment and referring primarily to FIGS. 2A, there are three surfaces and corresponding surface areas which may be sized and disposed so as to allow for the use of low actuation forces. The surface of the first end 66 which is disposed within the discharge port 54 and which "sees" the pressure P1 therein while the fuel injector 10 is closed has a first surface area $A_1$. The exposure of the first end 66 to this pressure $P_1$ exerts a force $F_1$ on the discharge control member 62. Based upon the orientation or disposition of the first end 66, the vector of the force $F_1$ is axially aligned with/parallel to the discharge control member 62, is at least generally in the direction of the second position of the discharge control member 62, and the magnitude of such is equal to $P_1 \times A_1$. The force $F_1$ thereby assists in opening the fuel injector 10. By having an increased area which is exposed to the discharge pressure $P_1$, this may significantly reduce the amount of force which is required to be exerted on the discharge control member 62 by the solenoid 14. In one embodiment, the area $A_1$ is about 0.0227 in$^2$ when $P_1$ is about 500 psi, when P2 is about 1,000 psi, and when the diameter of the discharge port 54 is about 0.085 inch.

Figure 3A:
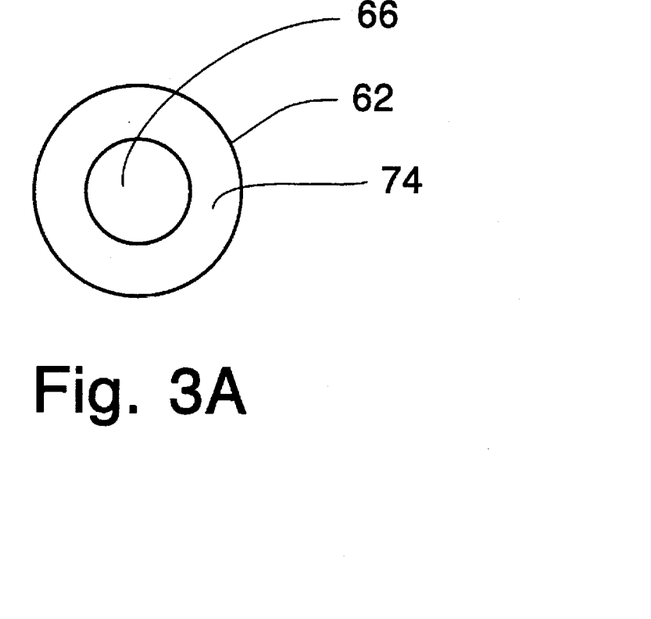
FIG. 3A is an end view of the discharge control member of FIG. 2A.

A second surface of the discharge control member 62 which assists in opening the fuel injector 10 for fuel injection is exposed to the pressure P2 in the reservoir 84 of the fuel injector body 50. The pressure $P_2$ is the inlet pressure as defined above. One way of providing this surface is to configure the discharge control member 62 to include a generally frustumly-shaped chamfer 74 which extends outwardly relative to the central longitudinal axis from the first end 66 as illustrated in FIGS. 2A and 3A. The surface of the chamfer 74 which "sees" the pressure $P_1$ has an area $A_2$. The exposure of the chamfer 74 to this pressure $P_2$ exerts a force $F_2$ on the discharge control member 62. Based upon the orientation or disposition of the chamfer 74, the vector of the force $F_2$ is aligned with/parallel to the discharge control member 62, is at least generally in the direction of the second position of the discharge control member 62, and the magnitude of such is equal to $P_2 \times A_2$. The force $F_2$ thereby also assists in opening the fuel injector 10. Although it may be possible to utilize only the area of the discharge control member 62 which "sees" the discharge pressure $P_1$ to achieve the desired low actuation force, in order to provide for a desired/required mass flow rate through the discharge port 54 it may be desirable/necessary to utilize the area $A_2$. In one embodiment, the area $A_2$ is about 0.005 in.$^2$ when $P_1$ is about 500 psi, when $P_2$ is about 1,000 psi, and when the diameter of the discharge port 54 is about 0.085 inches.

A third surface of the discharge control member 62 is disposed so as to at least bias the discharge control member 62 toward its first position to block the discharge control port 54 and to also assist in closing the fuel injector 10. This third surface in the illustrated embodiment is the second end 70 of the discharge control member which has an area $A_3$. The second end 70 "sees" the pressure $P_2$ or the inlet pressure within the reservoir 84 via the side gap 106 and the upper gap 102. The exposure of the second end 70 to this pressure $P_2$ exerts a force $F_3$ on the discharge control member 62. Based upon the orientation/disposition of the second end 77, the vector of the force $F_3$ is aligned with/parallel to the discharge control member 62, is at least generally in the direction of the first position of the discharge control member 62, and the magnitude of such is equal to $P_2 \times A_3$. The force $F_3$ thereby assists in at least biasing the discharge control member 62 toward its first position. In one embodiment, the area $A_3$ ranges from about 0.05 in.$^2$ when $P_1$ is about 500 psi, when $P_2$ is about 1,000 psi, and when the diameter of the discharge port 54 is about 0.085 inches.

The areas $A_1$, $A_2$, and $A_3$ may be selected based upon the pressures $P_1$ and $P_2$ to allow for use of a low actuation force such as no more than about 40 pounds-force, preferably no greater than about 10 pounds-force and even more preferably no greater than about 5 pounds-force. Preferably these low actuation forces will also open the fuel injector 10 in no more than about 3 milliseconds and even more preferably in no more than about 1 milliseconds. More specifically, with a given discharge pressure $P_1$ and a given inlet pressure $P_2$ (i.e., utilizing a predetermined value for $P_1$ and $P_2$ as design criteria), the magnitude of the areas $A_1$, $A_2$, and $A_3$ may be jointly selected to accommodate the use of these low actuation forces. Since the areas may be selected based upon the inlet pressure $P_2$ and discharge pressure $P_1$, the use of a low actuation force is not limited to use with only low discharge pressures. For instance, areas $A_1$, $A_2$, and $A_3$ may be jointly selected to provide for a low actuation force for all discharge pressures ranging from a vacuum up to preferably about 1,000 psi which is a typical maximum pressure in a cylinder of an internal combustion engine.

The joint selection of areas which result in the exertion of axial-like forces on the discharge control member 62 allows low actuation forces to be utilized even when the injector 10 is injecting fuel into a high-pressure environment. For instance, this allows the injector 10 to inject fuel into the cylinder 90 as the piston 94 approaches its TDC position. Although the fuel injector 10 could of course inject the fuel with the piston 94 at its BDC position, the fuel injector 10 can be opened with a maximum actuation force of preferably about 10 pounds-force even when the piston 94 is substantially at its TDC position (i.e., having completed about 20% of the stroke between the BDC position and the TDC position). Injecting fuel into the cylinder 90 at this time increases the volumetric efficiency of the engine.

Since the only surfaces of the discharge control member 62 which are exposed to the inlet pressure $P_2$ and which are oriented to exert an axial-like force component on the discharge control member 62 are the chamfer 74 and the second end 70, the inlet pressure $P_2$ exerts a radially inwardly directed force on all remaining portions of the discharge control member 62. These radially inwardly directed forces offset each other and in fact assist in maintaining the discharge control member 62 in alignment with the discharge port 54.

Figure 2B:
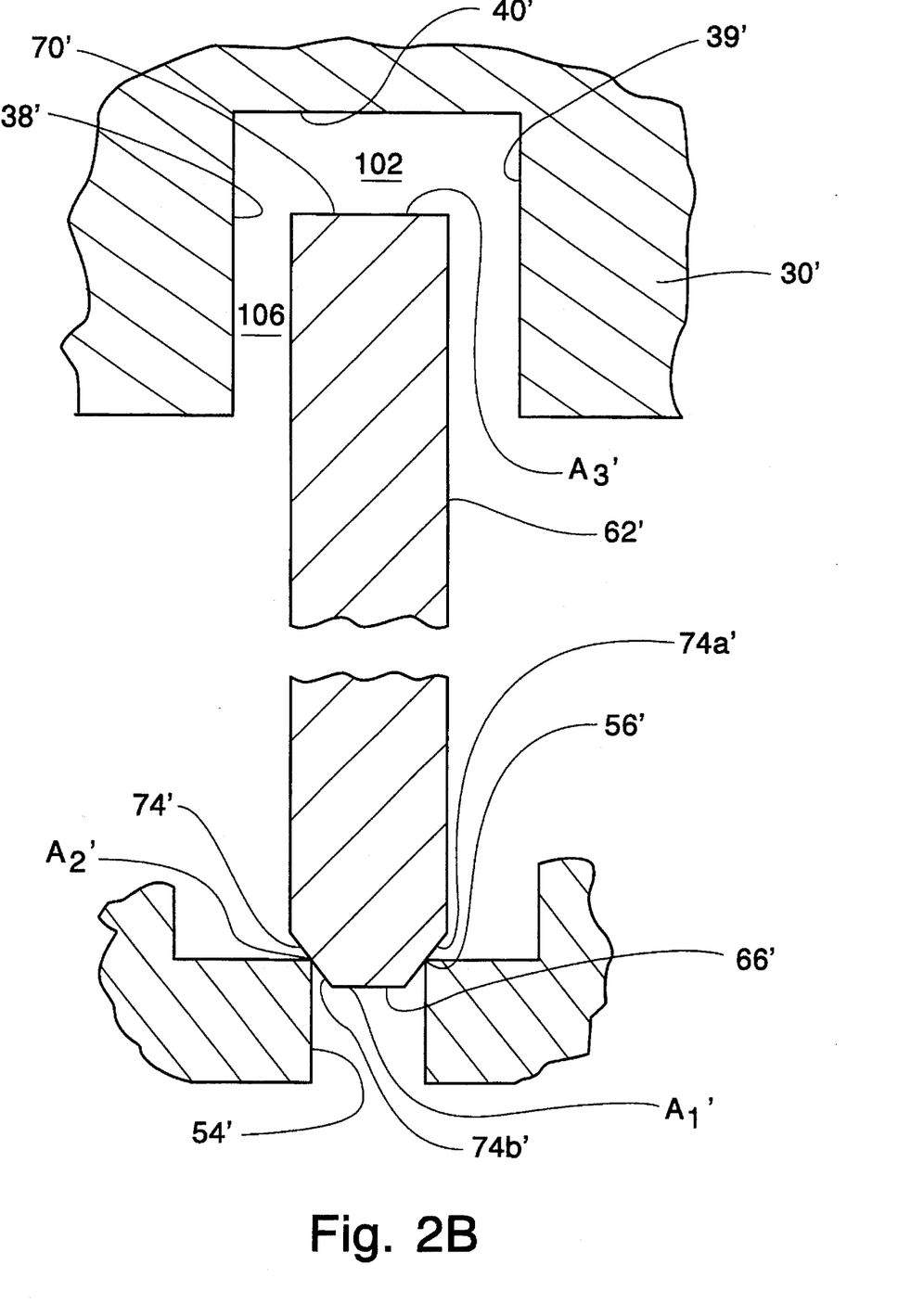
FIG. 2B is an alternative relationship between the discharge control member and the discharge port.
Figure 3B:
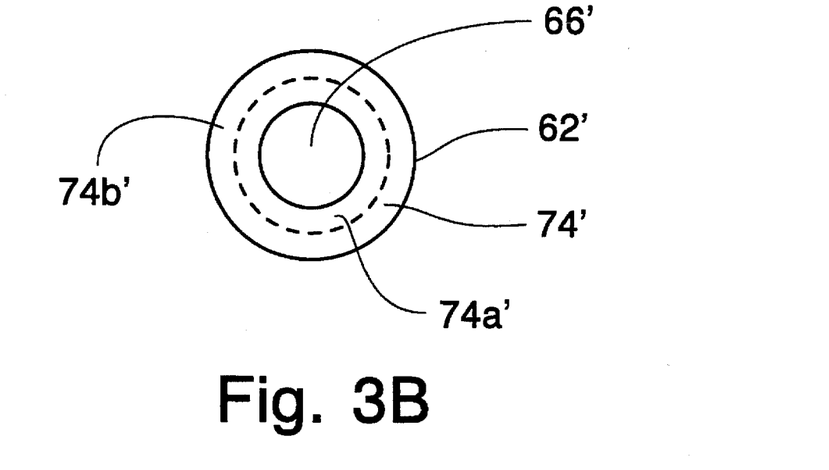
FIG. 3B is an end view of the discharge control member of the FIG. 2B.

An alternative relationship between the discharge control member and the surface against which the discharge control member seats to block the discharge port is illustrated in FIG. 2B. In the case of the discharge control member 62', the seal between the discharge control member 62' and the surface 56' is provided by the engagement of an annular portion of the chamfer 74' with the edge of the surface 56'. That is, part of the chamfer 74' is exposed to the discharge pressure $P_1$ (i.e., interiorly of the dashed line in FIG. 3B and designated as 74a'), while another part of the chamfer 74' is exposed to the discharge pressure $P_2$ (i.e., exteriorly of the dashed line in FIG. 3B and designated as 74b'). This type of engagement may be desirable/required in certain situations.

Summarizing the operation of the fuel injector 10 with regard to the dimensional relationship between the discharge control member 62 and the discharge port 54 illustrated in FIG. 2A, fuel under pressure is provided through the inlet passage 98 in the cylinder head 86 to the inlet port 58 of the fuel injector 10. In the case of a natural gas internal combustion engine, this will be a continuous supply. The introduction of pressurized fuel to the fuel injector 10 pressurizes the reservoir 84 to the pressure $P_2$. This inlet pressure $P_2$ acts upon the area $A_3$ of the second end 70 of the discharge control member 62 to exert a force $F_3$ which at least assists in maintaining engagement between the first end 66 of the discharge control member 62 and the surface 56 on the end of the fuel injector body 50. Preferably, this force $F_3$ alone maintains the fuel injector 10 in its closed condition (e.g., when the discharge control member 62 is in its first position, the return spring 46 is preferably not exerting any force on the discharge control member 62, but instead only the force $F_3$ is maintaining engagement between the first end 66 and the surface 66).

Additional axial-like forces act on the discharge control member 62 when the discharge control member 62 is seated on the surface 56. The discharge pressure $P_1$ acts on the area $A_1$ of the first end 66 of the discharge member 62 which interfaces with the interior of the discharge port 54 to exert a force $F_1$ on the discharge control member 62. The force $F_1$ is generally opposed to the force $F_3$ discussed above. Moreover, the inlet pressure $P_2$ acts on the area $A_2$ of the chamfer 74 which is exposed to the reservoir 84 to exert a force $F_2$ on the discharge control member 62. The force $F_2$ is also generally opposed to the force $F_3$ discussed above.

The magnitudes of the noted forces are such that $F_3 > F_1 + F_1$. However, the areas of the areas $A_1$, $A_2$, and $A_3$ are selected such that the difference in $F_3$ and the sum of $F_1$ and $F_2$ is such that preferably a maximum of about 10 pounds-force, and even more preferably no more than about 5 pounds-force, is required to be exerted on the discharge control member 62 by the solenoid 14 to move the member 62 from its first position to its second position. Preferably, these types of actuation forces will also move the discharge control member 62 from its first position to its second position in no more than about 3 milliseconds, preferably in no more than about 1 milliseconds, and even more preferably in no more than about 0.8 milliseconds.

At the desired time for fuel injection, a signal is provided to the solenoid 14 to provide the requisite current through the coil windings 18. The flow of current through the coil windings 18 creates a magnetic field which magnetizes both the core 22 and the plunger 30 and draws the plunger 30 toward the core 22. Since the discharge control member 62 is interconnected with the plunger 30, this moves the discharge control member 62 from its first position to its second position in which the first end 66 of the discharge control member 62 is vertically displaced from the discharge port 54. Fuel may then flow through the reservoir 84, out the discharge port 54, and into the cylinder 90. In order to provide the desired amount of fuel to the cylinder 90 in the desired amount of time, the discharge port 54 must be sized accordingly.

After the desired amount of fuel has been provided to the cylinder 90, the flow of current through the coil windings 18 is terminated which collapses the magnetic field. This substantially reduces if not alleviates the attractive forces between the core 22 and the plunger 30. Since the force $F_3$ exerted on the area $A_3$ of the second end 70 of the discharge control member 62 exceeds the sum of the forces $F_1$ and $F_2$, namely the force exerted on the area $A_1$ of the first end 66 of the discharge member 62 and the force exerted on the area $A_2$ of the chamfer 74 of the discharge member 62, respectively, and due to the compression of the spring 46 collectively move the discharge control member 62 from its second position back to its first position to seat on the surface 56 on the end of the fuel injector body 50 and to thereby block the discharge port 54. Preferably, this closing of the fuel injector takes no more than about 3 milliseconds, preferably no more than about 1 millisecond, and even more preferably no more than about 0.8 milliseconds.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A fuel injector, comprising:

a fuel injector body comprising an inlet port fluidly interconnectable with at least a fuel supply, a reservoir fluidly interconnected with said inlet port, and a discharge port fluidly interconnected with said reservoir and fluidly interconnectable with a combustion chamber of an engine; and a discharge control member movably interconnected with said fuel injector body and movable between first and second positions, wherein said discharge control member blocks said discharge port in said first position and is spaced from said discharge port in said second position, wherein said discharge control member comprises a first surface area disposed whereby a fluid pressure in said reservoir acts on said first surface area and biases said discharge control member toward said first position, wherein said discharge control member further comprises a second surface area which is disposed whereby a fluid pressure acting on said second surface area biases said discharge control member toward said second position, wherein said second surface area comprises an area of a second surface which interfaces with said discharge port when said discharge control member is in said first position, and wherein a magnitude of said first surface area and said second surface area are jointly selected whereby a force required to be exerted on and move said discharge control member from said first position to said second position is no more than about 10 pounds-force.

2. A fuel injector, as claimed in claim 1, wherein:

said fuel supply comprises natural gas.

3. A fuel injector, as claimed in claim 1, wherein:

said discharge port discharges into an intake port which discharges into said combustion chamber.

4. A fuel injector, as claimed in claim 1, wherein:

said discharge port discharges directly into a cylinder comprising said combustion chamber.

5. A fuel injector, as claimed in claim 1, wherein:

said discharge control member comprises a substantially axially extending discharge control rod, said discharge control member moving axially between said first and second positions.

6. A fuel injector, as claimed in claim 1, wherein:

said discharge control member comprises a first end portion comprising a chamber, wherein a first part of said chamfer is seated against said discharge port and a second part of said chamfer is disposed out of said discharge port and interfaces with said fluid pressure in said reservoir, and wherein said second surface area further comprises an area of said second part of said chamfer.

7. A fuel injector, as claimed in claim 1, wherein:

said discharge control member comprises a third surface disposed whereby said fluid pressure in said reservoir acts on said third surface and biases said discharge control member toward said second position, and wherein said second surface area comprises an area of said third surface.

8. A fuel injector, as claimed in claim 1, wherein:

said force required to be exerted on and move said discharge control member from said first position to said second position is no more than about 5 pounds-force.

9. A fuel injector, as claimed in claim 1, further comprising:

means for aligning said discharge control member relative to said discharge port and comprising said fluid pressure in said reservoir.

10. A fuel injector, as claimed in claim 1, further comprising:

an axial drive assembly interconnected with said discharge control member and comprising an axially movable first member, said first member comprising a first cavity with at least part of said discharge control member being disposed in said first cavity.

11. A fuel injector, as claimed in claim 10, wherein:

said first member and said discharge control member are magnetically coupled.

12. A fuel injector, as claimed in claim 10, wherein:

said discharge control member comprises first and second ends, said second end being disposed within said first cavity and said first end interfacing with said discharge port when said discharge control member is in said first position.

13. A fuel injector, as claimed in claim 10, wherein:

said at least part of said discharge control member has a diameter less than a diameter of said first cavity, wherein said discharge control member comprises a first surface which projects toward said first member and which is disposed at an angle relative to a central, longitudinal axis of said discharge control member and which is spaced from said first cavity, and wherein said first surface area comprises an area of said first surface of said discharge control member.

14. A fuel injector, as claimed in claim 10, wherein:

said axial drive assembly comprises a solenoid.

15. A fuel injector, as claimed in claim 1, further comprising:

at least one biasing member interconnected with said discharge control member, wherein when said discharge control member is in said second position said biasing member biases said discharge control member toward said first position.

16. A fuel injector, as claimed in claim 15, wherein:

said biasing member comprises a return spring.

17. A fuel injector, as claimed in claim 15, wherein:

said biasing member is substantially inactive when said discharge control member is in said first position.

18. A fuel injector, as claimed in claim 1, further comprising:

a solenoid comprising a first coil and a plunger magnetically and movably interconnected with said first coil, said plunger comprising a discharge control member cavity comprising a sidewall and an end wall, wherein part of said discharge control member is disposed in said discharge control member cavity and has a diameter less than a diameter of said discharge control member cavity, wherein a first end of said discharge control member projects toward and is spaced from said end wall of said discharge control member cavity in said plunger, and wherein said first surface area comprises of an area of said first end.

19. A fuel injector, as claimed in claim 18, wherein:

said discharge control member comprises a second end opposite said first end and comprising a chamfer extending from said second end, wherein a first part of said chamfer is seated on said discharge port and a second part of said chamfer is disposed out of said discharge port and interfaces with said fluid pressure in said reservoir, and wherein said second surface area further comprises an area of said second part of said chamfer.

20. A fuel injector, as claimed in claim 1, wherein:

said first and second surface areas are further jointly selected based upon a predetermined said fluid pressure in said reservoir and a predetermined said fluid pressure acting on said second surface area when said discharge control member is in said first position.

21. A fuel injector, as claimed in claim 1, wherein:

said area of said second surface of said discharge control member is at least about 0.0227 in.$^2$.

22. A method for providing at least fuel to a cylinder of an engine using a fuel injector comprising a discharge port, comprising the steps of:

closing said discharge port with a discharge control member;

providing a pressurized fluid to said fuel injector comprising a fuel at least after said closing step;

opening said discharge port by moving said discharge control member after at least a portion of said providing step, said opening step comprising using a force of no more than about 10 pounds for all pressures acting on said discharge control member after said closing step within the range from a vacuum to about 1,000 pounds per square inch; and discharging said pressurized fluid to a cylinder of an engine.

23. A method, as claimed in claim 22, wherein said discharge control member is movable between first and second positions, said discharge control member closing said discharge port when in said first position and being displaced from said discharge port when in said second position.

24. A method, as claimed in claim 23, wherein:

said opening step comprises using said pressurized fluid in said fuel injector to move said discharge control member to said second position.

25. A method, as claimed in claim 23, wherein:

said opening step comprises exerting a first force on said discharge control member with said pressurized fluid, wherein at least one vector component of said first force is at least generally directed toward said second position.

26. A method, as claimed in claim 23, wherein:

said opening step comprises using a pressure within said cylinder.

27. A method, as claimed in claim 23, wherein:

said opening step comprises exerting a first force on said discharge control member by a pressure within said cylinder and exerting a second force on said discharge control member by said pressurized fluid from said providing step, said first and second forces each having at least one vector component which is at least directed generally toward said second position.

28. A method, as claimed in claim 27, wherein said fuel injector further comprises a drive assembly having at least a portion movable between third and fourth positions, wherein said at least a portion of said drive assembly is in said third position when said discharge control member is in said first position and wherein said at least a portion of said drive assembly is in said fourth position when said discharge control member is in said second position, wherein:

said opening step comprises overcoming a third force on said discharge control member by moving said at least a portion of said drive assembly from said third position to said fourth position, said third force having at least one vector component which is at least directed generally toward said second position of said discharge control member.

29. A method, as claimed in claim 23, wherein:

said opening step comprises moving said discharge control member from said first position to said second position in no more than about 3 milliseconds.

30. A method, as claimed in claim 23, wherein:

said opening step comprises moving said discharge control member from said first position to said second position in no more than about 1 millisecond.

31. A method, as claimed in claim 23, wherein:

said closing step comprises moving said discharge control member from said second position to said first position after at least a portion of said discharging step.

32. A method, as claimed in claim 31, wherein:

said closing step comprises exerting a force on said discharge control member with said pressurized fluid.

33. A method, as claimed in claim 31, wherein:

said closing step comprises exerting a force on said discharge control member with a compressed biasing member.

34. A method, as claimed in claim 31, wherein:

said closing step comprises exerting a force on said discharge control member with said pressurized fluid and exerting a force on said discharge control member with a compressed biasing member.

35. A method, as claimed in claim 31, wherein:

said closing step comprises moving said discharge control member from said second position to said first position in no more than about 3 milliseconds.

36. A method, as claimed in claim 31, wherein:

said closing step comprises moving said discharge control member from said second position to said first position in no more than about 1 millisecond.

37. A method, as claimed in claim 22, wherein:

said discharging step is directly into said cylinder.

38. A method, as claimed in claim 22, wherein:

said discharging step is into an intake port fluidly interconnecting said fuel injector and said cylinder.

39. A method, as claimed in claim 22, wherein said engine comprises a piston which reciprocates between a bottom-dead-center position and a top-dead-center position, wherein:

said opening step is initiated when said piston is substantially at said top-dead-center position.

40. A method, as claimed in claim 39, wherein:

said substantially at top-dead-center position comprises said piston having traveled at least about ninety percent of a distance between said bottom-dead-center position and said top-dead-center position.

41. A method, as claimed in claim 22, wherein said fuel injector is movable between first and second positions, said discharge control member blocking said discharge port when in said first position and being displaced from said discharge port when in said second position, wherein said fuel injector further comprises a drive member coupled with said discharge control member and movable between third and fourth positions, said drive member being in said third position when said discharge control member is in said first position and said drive member being in said fourth position when said discharge control member is in said second position.

42. A method, as claimed in claim 39, further comprising the step of:

closing said discharge port after at least a portion of said discharging step, said closing step comprising introducing part of said pressurized fluid into a space between said drive member and said discharge control member.

43. A fuel injector, comprising:

a fuel injector body comprising an inlet port fluidly interconnectable with at least a fuel supply, a reservoir fluidly interconnected with said inlet port, and a discharge port fluidly interconnected with said reservoir and fluidly interconnectable with a combustion chamber of an engine; and a discharge control member movably interconnected with said fuel injector body and movable between first and second positions, wherein said discharge control member blocks said discharge port in said first position and is spaced from said discharge port in said second position, wherein said discharge control member comprises a first surface area disposed whereby a fluid pressure in said reservoir acts on said first surface area and biases said discharge control member toward said first position, wherein said discharge control member further comprises a second surface area which is disposed whereby a fluid pressure acting on said second surface area biases said discharge control member toward said second position, wherein said second surface area comprises an area of a second surface which interfaces with said discharge port when said discharge control member is in said first position, and wherein said area of said second surface is at least about 0.277 in.$^2$.

* * * * *